United States Patent [19]

Havens

[11] Patent Number: 5,091,195

[45] Date of Patent: Feb. 25, 1992

[54] SYSTEM FOR PRODUCING LOW CHOLESTEROL EGGS AND FEED ADDITIVE RESULTING IN SAME

[76] Inventor: Alice L. Havens, Route 39 North, RD 1, Box 87, Sherman, Conn. 06784

[21] Appl. No.: 384,265

[22] Filed: Jul. 24, 1989

[51] Int. Cl.$^5$ .............................................. A23K 1/14
[52] U.S. Cl. .................................. 426/2; 426/61; 426/623; 426/630; 426/635; 426/807
[58] Field of Search ................... 426/2, 635, 61, 601, 426/807, 623, 630

[56] References Cited

U.S. PATENT DOCUMENTS 4,120,986 10/1978 Lynn ................................ 426/549

OTHER PUBLICATIONS

Merciq Raising, "Poultry the Modern Way", Garden Way Publishers Charlotte, Vt. (1975), pp. 42-45 & 56-59.
Bogart et al., "Scientific Farm Animal Production", Managing Poultry Burgess Publishing Co., Minneapolis, Minn. (1983), pp. 312-319.
LaDa et al., "Fundamentals of Drug Metabolism & Drug Disposition", Williams & Wilkens Co., Baltimore, Md. (1971), pp. 262-267.
Cook et al., "Nutritive Value of Eggs", Egg Science & Technology (1983), pp. 92-109.
Bell, "What's in an Egg", Agricultural Extension, University of California, Riverside, Calif. (1972), pp. 1-2.
Ensminger et al., "Feeds & Nutrition Complete", Ensminger Publishing Co., First Edition, Clovis, Calif. (1972), pp. 39, 365-366, 421, 865-869, 876-882, 893, 916, 918 and 1076.
Rybina et al., "Nutrient Utilization and Enzyme Activity in Pancreas and Small Intestine in Hens Fed on Diets Containing Different Amount of Lucerne Meal and Animal Feeds", abstracted from Dialog File 50, Acession No. 0657415 (1985).
Morrison, "Feeds & Feeding", Morrison Publishing Co., Ithaca, N.Y., 1957, pp. 307-308.
Chang et al., Effect of Dietary Vegetable & Type of Carbohydrate on Lipid Materials in Rats., U.S. Sci. Educ. Adm. Nutr. Institute Beltsville, Md., 1978, pp. 337-344.
Knehans et al., "Unrecognized Dietary Factor for Guinea Pigs Associated with the Fibrous Fractions of Plant Products", J. Nutr., vol. 109 (3), 1979, pp. 418-425, Dialog Abstract Biosis No. 68062382.
Morrison, "Feeds & Feeding", The Morrison Publishing Co., Ithaca, N.Y. (1957), pp. 1020-1023.
Morrison, "Feeds and Feeding", The Morrison Publishing Co., Ithaca, N.Y. (1957), pp. 396 & 1128-1131.
Kim et al., "Effects of Different Dietary Sources of Cholesterol, Protein Fiber on Lipid Metabolism in Broiler Chicks", File 50 Cab abstracts AN 00056-2566 of Korean Journal of Animal Science, 1985, vol. 27, pp. 381-385.

*Primary Examiner*—R. B. Penland
*Attorney, Agent, or Firm*—Haynes N. Johnson

[57] ABSTRACT

A feed for hens which serves to reduce the cholesterol content of eggs laid by the hens, the feed being made up of laying mash and dehydrated cabbage in a ratio of about three parts of laying mash to two parts of cabbage by weight. The cabbage has been dehydrated by a process which does not raise its temperature to the point where enzymes therein are inactivated. It is believed that the enzymes in the dehydrated cabbage serve to induce cytochrome P-450 in the hen to break down the cholesterol in the body of the hen and, so, reduce the amount going into the eggs.

20 Claims, No Drawings

SYSTEM FOR PRODUCING LOW CHOLESTEROL EGGS AND FEED ADDITIVE RESULTING IN SAME

FIELD OF THE INVENTION

This invention relates to the field of low cholesterol eggs and, in particular, to a feeding system for hens that results in their laying eggs with almost one-third less cholesterol than normal eggs, i.e., the U.S.D.A standard egg.

BACKGROUND OF THE INVENTION

Considerable work has been done studying the nutritional value of eggs and of the effects of different types of feed on hens. These are reported in, for example:
Cook, Frances and Briggs, George M., Nutritional Value of Eggs, 1983
Ensminger and Elentine, Feeds And Nutrition Complete, 1972
Mercia, Leonard S., Raising Poultry The Modern Way, 1975
Taylor, Robert E., and Bogart, Ralph, Scientific Farm Animal Production, 1983
Way, E. Leong, Mardel, H. George, and LaDu, Bert N., Fundamentals Of Drug Metabolism & Drug Disposition, 1971

Apparently, however, no simple method has been found for appreciably reducing the cholesterol content of chicken eggs.

BRIEF SUMMARY OF THE INVENTION

My empirical studies have revealed that changing the diet of laying hens to include cabbage serves to reduce the cholesterol content of the resulting eggs. By dehydrating the cabbage leaves before feeding them to the hens, this cholesterol reduction is appreciably greater since approximately four times as much of the chemical constituents of the cabbage can be fed to a hen, roughly four ounces per day. This provides greater concentration of these active constituents, including an enzyme that induces an enzyme cytochrome P-450 to break down the cholesterol in the body of the hen.

My studies have shown that the cholesterol content of eggs is reduced to about 341 mg/100 g as compared to about 500 mg/100 g in the U.S.D.A. standard for eggs.

DETAILED DESCRIPTION OF THE INVENTION

My research involved testing various dietary supplements to a hen's diet to determine if any of them would lower the cholesterol content of the resulting eggs. I found that feeding a quarter head of cabbage (*Brassica Oleracea*) per day did lower the cholesterol content.

It was thought at first that this result might be due to the high water content of the cabbage, which flushed out the hen's digestive system. To test this hypothesis, dehydrated cabbage was tried.

The cabbage was dehydrated by cutting it into strips one-quarter inch wide and placing it into a dehydrator at 130° F. for twelve hours. As it turned out, the use of this 130° F. temperature was low enough so that enzymes in the cabbage would not be destroyed (inactivated); and it is advisable to keep the dehydrator temperature below that which would inactivate enzymes (about 185° F.)

The dehydrator used had eight stacking trays and a fan and heater. This process would reduce a whole head of cabbage to about three cups of dry flakes.

Using dehydrated cabbage means that the important chemicals in the cabbage, including enzymes, are concentrated and that about four times the effective amount of those chemicals can be fed to a hen in its diet. The results of my tests showed that the use of about four ounces of dehydrated cabbage and about six ounces of a typical laying mash, such as Agway Country Egg Layer, reduced the cholesterol content of the eggs substantially, and considerably more than the use of un-dehydrated cabbage.

The mechanism by which this cholesterol reduction is accomplished is uncertain. Research discloses that cabbage includes an enzyme that induces the production in the hen of cytochrome P-450. This enzyme is probably aromatic hydrocarbon hydroxylase (AHH).

It is my theory that P-450 is a naturally occurring mixed function oxadase (hydroxylase) and that it, or AHH itself, is responsible for the breakdown of the cholesterol which is synthesized naturally by the bodies of many animals, including hens. P-450 is not naturally induced in hens and, therefore, does not normally break down a hen's bodily cholesterol.

When AHH, and so P-450, is induced into the body of the hen, it seemingly removes one water molecule from the cholesterol through the process of hydroxolation. This detoxifies the cholesterol molecule and allows it to be used by the hen's body for energy purposes. As a result, there is less cholesterol available to go into the eggs.

When a hen is fed cabbage or dehydrated cabbage, the P-450 cytochrome is induced. But, by feeding dehydrated cabbage, the chemicals received by the hen are in substantially greater concentration and, so, the inducement is on a much higher level. The result is an egg much lower in cholesterol content.

There is a possibility that soluble fiber in the cabbage is what serves to reduce the cholesterol content of the eggs. I doubt if this is so, however, because it is my understanding that the quantity of soluble fiber in cabbage is small.

TESTING PROCEDURE

I used Hall's Golden Cross hens in my tests. The hens were divided into several groups, two of which were control groups that received no cabbage, only laying mash. A third group received fresh cabbage (about four ounces, one-quarter head, per day) and laying mash. A fourth group received dehydrated cabbage (the equivalent of a full head per day, but weighing only about four ounces) and laying mash. In all instances the laying mash used was the Agway mash mentioned above, but I believe that other laying mashes would also work. All groups were cared for similarly except for their diets.

All groups of hens were kept on their particular diet for two weeks, after which eggs from the group were identified and sent to a laboratory for cholesterol testing. For comparison some eggs purchased from a local retail store were also sent for testing.

The laboratory results showed that the dehydrated cabbage lowered the cholesterol level in the eggs by about 24 mg/100 g compared to the use of fresh cabbage. Compared to the purchased eggs, it lowered the cholesterol by about 102 mg/100 mg. In comparison with the U.S.D.A. standard egg, it was lowered by about 159 mg/ 100 g. The results were as follows:

| Egg type | Cholesterol content per 100 grams |
|---|---|
| Dehydrated cabbage | 341 mg |
| Fresh cabbage | 365 mg |
| Control groups | 389 mg and 386 mg |
| Purchased | 443 mg |
| U.S.D.A. standard | 500 mg |

Thus, it can be seen that the cholesterol was reduced as follows:

| Cabbage type | Control | Purchased | U.S.D.A. |
|---|---|---|---|
| Dehydrated | −12% | −23% | −32% |
| Fresh | −6% | −18% | −27% |

There is, therefore, as can be seen, considerable advantage in using dehydrated cabbage rather than fresh cabbage. It is believed that there would an even greater advantage, both in results and in cost, if the active constituent in the cabbage causing this reduction in cholesterol were identified and, itself, fed to the hens rather than cabbage.

My system for reducing cholesterol in eggs ca be practiced in any of several ways. The dehydrated cabbage can be fed separately from the laying mash; it can be mixed with the mash by the farmer; or it can be mixed with the mash by the manufacturer of the mash. The use of dehydrated cabbage is advantageous in the latter instance since it will not readily spoil during storage. The best ratio for the mixture is one that would result in the hen receiving about four ounces of dehydrated cabbage per day mixed with mash in a ratio of about one part cabbage to about three parts of mash by volume. This would normally mean a mixture having about six ounces of laying mash for each four ounces of dehydrated cabbage, a ratio of about 3:2 by weight. If desired, the dehydrated cabbage can be mixed with types of feed other than laying mash.

I believe that other members of the Brassica family, such as broccoli, Brussels sprouts, cauliflower, kohlrabi, and turnip may be substituted for the cabbage since they contain similar chemical constituents.

To be certain that the eggs were palatable, taste tests were run. It was found that persons could not tell the difference in taste between ordinary eggs and my low cholesterol eggs. It was also found that the egg could be successfully cooked in all the usual manners.

I claim:

1. A feed for hens said feed consisting essentially of mash mixed with dehydrated *Brassica oleracea* in such proportions that in its normal diet a hen would consume about four ounces of said *Brassica oleracea* each day whereby the cholesterol content of eggs laid by the hen is reduced.

2. A feed for hens as set forth in claim 1 in which the ratio of said mash to said *Brassica oleracea* is about three to two by weight.

3. A feed for hens as set forth in claim 1 in which said *Brassica oleracea* has been dehydrated at a temperature below about 185° F., whereby enzymes in said *Brassica oleracea* are not substantially inactivated.

4. A feed for hens as set forth in claim 1 in which enzymes in said *Brassica oleracea* have not been inactivated.

5. A feed for hens said feed consisting essentially of a combination of mash and the constituent of *Brassica oleracea* which induces cytochrome P-450 in said hens in an amount effective to break down cholesterol in he body of the hens thereby reducing the cholesterol content of eggs laid by said hens.

6. A feed for hens as set forth in claim 5 in which the quantity of said constituent in a normal day's feed for a hen is equivalent to that found in about four ounces of dehydrated *Brassica Oleracea*.

7. A feed for hens as set forth in claim 5 in which said cnostituent is an aromatic hydrocarbon hydroxylase.

8. A feed mixture for hens, said mixture consisting essentially of laying mash and dehydrated cabbage having cholesterol reducing enzymes therein, said feed mixture having a ratio of about three parts of said laying mash to about two parts of said dehydrated cabbage, by weight, said cabbage having been dehydrated so as to not inactivate the enzymes therein whereby the cholesterol content of eggs laid by said hens is reduced.

9. A feed for hens said feed consisting essentially of dehydrated *Brassica oleracea* in such proportions that, in its normal diet, a hen would consume about four ounces of said dehydrated *Brassica oleracea* each day, thereby reducing the cholesterol content of eggs laid by the hens.

10. A feed for hens as set forth in claim 9 in which said feed includes said dehydrated *Brassica oleracea* in such proportion that, in its normal diet, a hen would consume about four ounces of said dehydrated *Brassica oleracea* each day.

11. A feed for hens as set forth in claim 9 in which the ratio of the rest of said feed to said dehydrated *Brassica oleracea* is about three to two by weight.

12. A feed for hens as set forth in claim 9 in which enzymes in said dehydrated *Brassica oleracea* have not been inactivated.

13. The method of reducing the cholesterol content of eggs which comprises the steps of adding dehydrated cabbage to the diet of hens and feeding said diet to laying hens;
   wherein, since said cabbage is dehydrated, said hens can eat a sufficient quantity of said cabbage each day to significantly reduce said cholesterol content of said egg.

14. The method of reducing the cholesterol content of eggs as set forth in claim 13 in which said cabbage has been dehydrated at a temperature which is not high enough to inactivate enzymes therein.

15. The method of reducing the cholesterol content of eggs as set forth in claim 13 in which about four ounces of dehydrated cabbage is fed to each hen per day.

16. The method of reducing the cholesterol content of eggs as set forth in claim 13 in which enzymes in said cabbage have not been inactivated.

17. The method of reducing the cholesterol content of eggs which comprises the steps of adding dehydrated *Brassica oleracea* to the diet of hens and feeding said diet to laying hens,
   whereby, since said *Brassica oleracea* is dehydrated, said hens can eat a sufficient quantity of said *Brassica oleracea* each day to significantly reduce said cholesterol content of said eggs.

18. The method of reducing the cholesterol content of eggs as set forth in claim 17 in which said *Brassica oleracea* has been dehydrated at a temperature which is not high enough to inactivate enzymes therein.

19. The method of reducing the cholesterol content of eggs as set forth in claim 17 in which about four ounces of said dehydrated *Brassica oleracea* is fed to each hen per day.

20. The method of reducing the cholesterol content of eggs as set forth in claim 17 in which enzymes in said cabbage have not been inactivated.

* * * * *